United States Patent [19]

Sawada et al.

[11] 4,131,097

[45] Dec. 26, 1978

[54] IGNITION SYSTEM FOR INTERNAL COMBUSTION ENGINES

[75] Inventors: Daisaku Sawada; Kenji Goto; Takashi Shigemaut; Yuji Takeda, all of Susono; Tadashi Hattori, Okazaki; Hiroaki Yamaguchi, Nakata; Minoru Nishida, Okazaki, all of Japan

[73] Assignees: Nippon Soken, Inc., Nishio; Toyota Jidosha Kogyo Kabushiki Kaisha, Toyota, both of Japan

[21] Appl. No.: 763,153

[22] Filed: Jan. 27, 1977

[30] Foreign Application Priority Data

Feb. 5, 1976 [JP] Japan .................................. 51-11714
Jun. 11, 1976 [JP] Japan .................................. 51-68945

[51] Int. Cl.² ............................................. F02P 5/04
[52] U.S. Cl. ........................... 123/117 R; 123/32 EE; 123/117 D; 123/148 C
[58] Field of Search ........... 123/117 R, 117 D, 148 E, 123/119 ED, 32 EE

[56] References Cited

U.S. PATENT DOCUMENTS

| 3,418,989 | 12/1968 | Silverman | 123/148 E |
|---|---|---|---|
| 3,757,755 | 9/1973 | Carner | 123/117 D |
| 3,906,207 | 9/1975 | Rivere et al. | 123/32 EE |
| 3,957,023 | 5/1976 | Peterson | 123/117 D |
| 3,990,412 | 11/1976 | Zechnall et al. | 123/117 D |
| 3,996,911 | 12/1976 | Canup | 123/117 D |
| 4,015,565 | 4/1977 | Aono et al. | 123/117 D |
| 4,033,305 | 7/1977 | Maioglio et al. | 123/117 D |
| 4,054,111 | 10/1977 | Sand | 123/117 R |

Primary Examiner—Charles J. Myhre
Assistant Examiner—R. A. Nelli
Attorney, Agent, or Firm—Cushman, Darby & Cushman

[57] ABSTRACT

An ignition system for internal combustion engines wherein an ignition timing computer circuit starts the computation of an ignition timing in response to the detection of a predetermined angular position of the crankshaft of an internal combustion engine by an angular position detector, and an ignition device ignites the engine according to the computed ignition timing. A pressure detector detects variations of the pressure in the cylinders caused by the ignition of the engine and a retard-advance detector determines whether the angular position of the engine crankshaft corresponding to the maximum cylinder pressure agrees with the desired angular position. This retard-advance detector compensates the computation of ignition timing in the ignition timing computer circuit in accordance with its determination. In this way, the ignition timing of the engine is feedback controlled in such a manner that the pressure in the individual cylinders reaches a maximum value at the desired angular position of the crankshaft.

6 Claims, 19 Drawing Figures

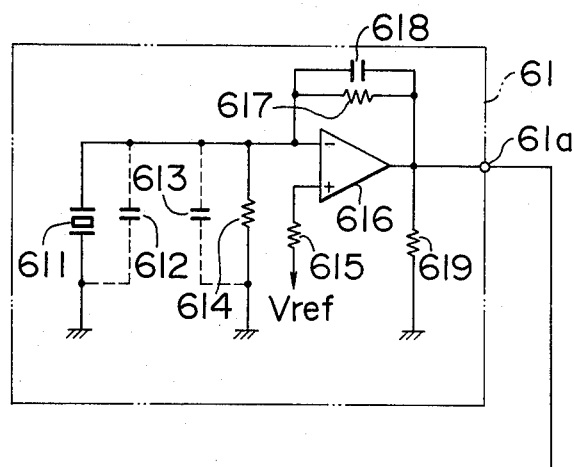
FIG. 10
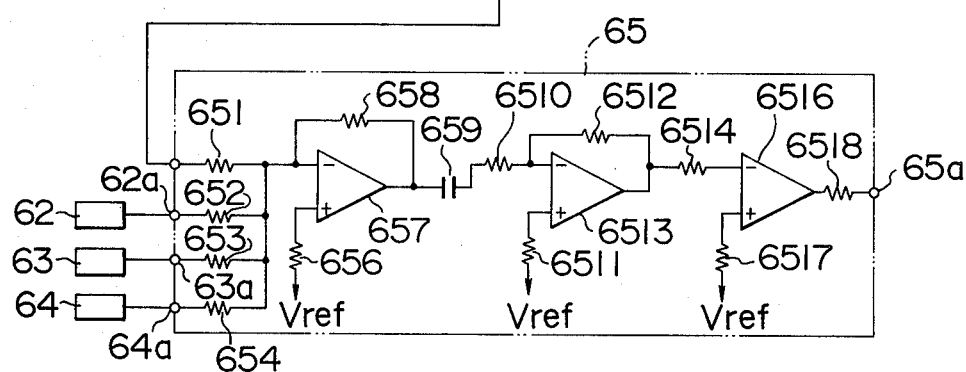
FIG. 11
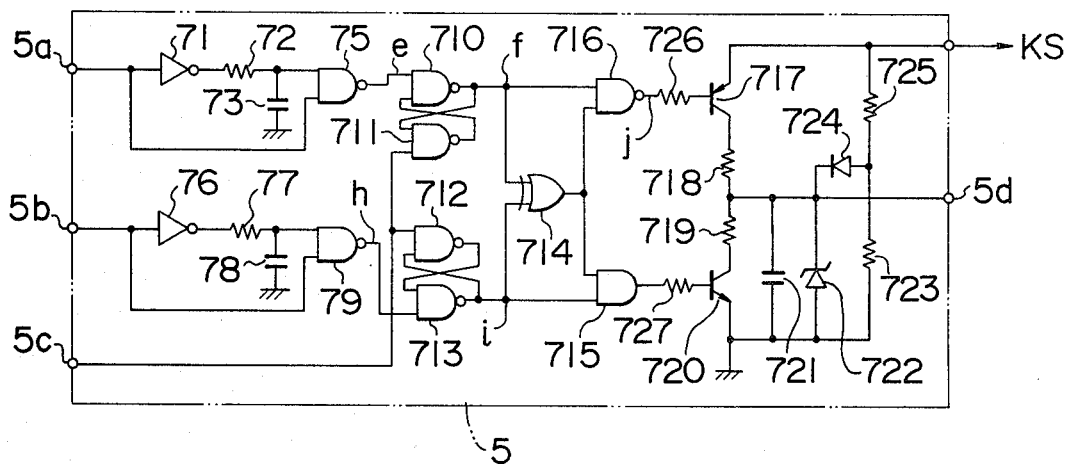

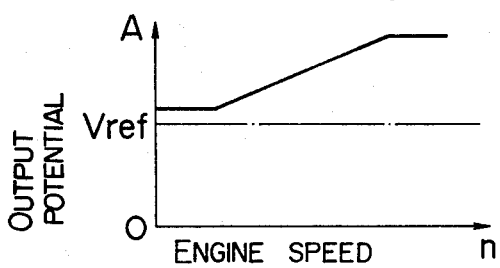
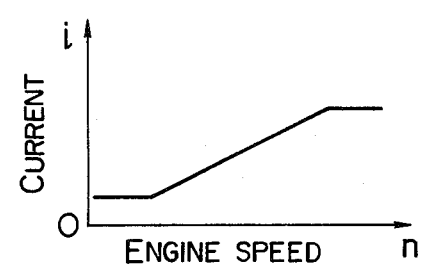
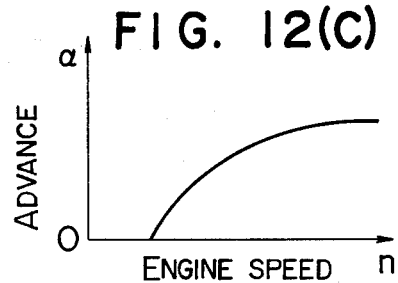
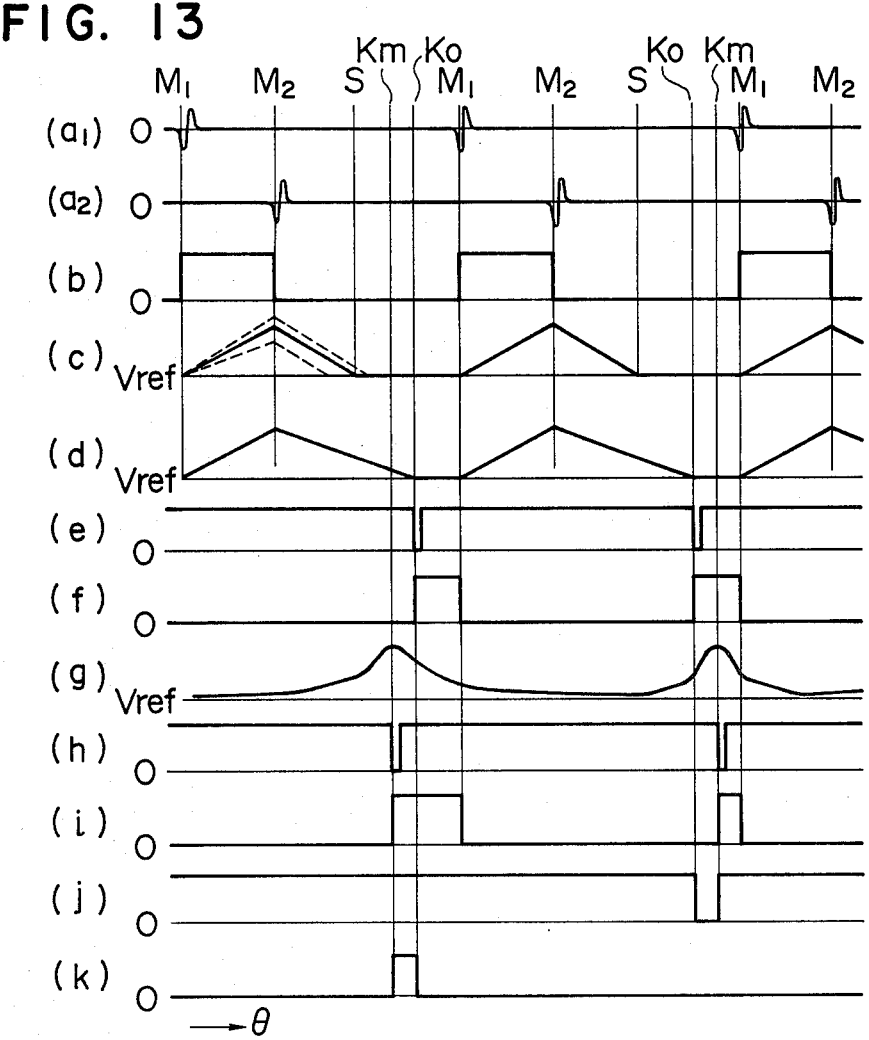

IGNITION SYSTEM FOR INTERNAL COMBUSTION ENGINES

BACKGROUND OF THE INVENTION

1. Field of the Invention

The present invention relates to an ignition system for internal combustion engines wherein the ignition timing of an internal combustion engine is electronically computed, and more particularly the invention relates to an ignition system wherein the ignition timing of an internal combustion engine is controlled by feeding back the pressure in the engine cylinders to compensate the ignition timing in such a manner that the cylinder pressure attains its maximum value at the desired angular position of the engine crankshaft.

2. Description of the Prior Art

The ignition timing of an internal combustion engine must be varied in accordance with the operating conditions of the engine in a manner such that an optimum operation of the engine is ensured. The prior art ignition timing control systems generally determines the ignition timing of an engine by detecting the engine speed by a centrifugal advance mechanism and by detecting the intake vacuum pressure by a vacuum advance mechanism to represent the operating conditions of the engine by them.

It is generally known in the art that for best efficiency and fuel consumption of an engine the engine should be ignited with the so-called minimum advance for best torque (MBT), and the ignition timing of the engine must be varied in accordance with the engine operating conditions to ignite the engine at the MBT.

A disadvantage of the prior art systems of the above-type is that since an ignition timing has been programmed on the basis of the test results of an internal combustion engine, there are many instances where the ignition timing considerably deviates from the actual MBT and the programmed ignition position differs from the actual ignition point due to the atmospheric conditions, the variations in characteristics among engines of the same type, and so on, thus making it practically difficult to compensate the ignition timing and thereby failing to ignite the engine with the required spark advance, and moreover due to the fact that the compensation factors include various surrounding conditions such as the engine speed, intake vacuum pressure and temperature, the inclusion of these compensation items makes the system expensive and complicate thus making it less practical due to its construction.

SUMMARY OF THE INVENTION

It is an object of the present invention to provide an ignition system for internal combustion engines whereby the ignition timing of an internal combustion engine is controlled by compensating the ignition timing in accordance with the ratio between the maximum value of the cylinder pressure attained when the mixture is exploded and the maximum value of the cylinder pressure attained when no mixture is exploded.

It is another object of this invention to provide an ignition system for internal combustion engines whereby the ignition timing of an internal combustion engine is controlled by compensating the ignition timing in accordance with the difference between the angular position of the crankshaft at which the cylinder pressure attains its maximum value and the desired crankshaft angular position.

BRIEF DESCRIPTION OF THE DRAWINGS

FIGS. 9 through 11 are wiring diagrams showing a detailed circuit construction of a second embodiment of the invention.

FIG. 12 shows characteristic diagrams which are useful for explaining the spark advance control in relation to engine speed of the second embodiment shown in FIGS. 9 through 11.

FIG. 13 is a time chart useful for explaining the operation of the second embodiment shown in FIGS. 9 through 11.

DESCRIPTION OF THE PREFERRED EMBODIMENTS

Figure 1:
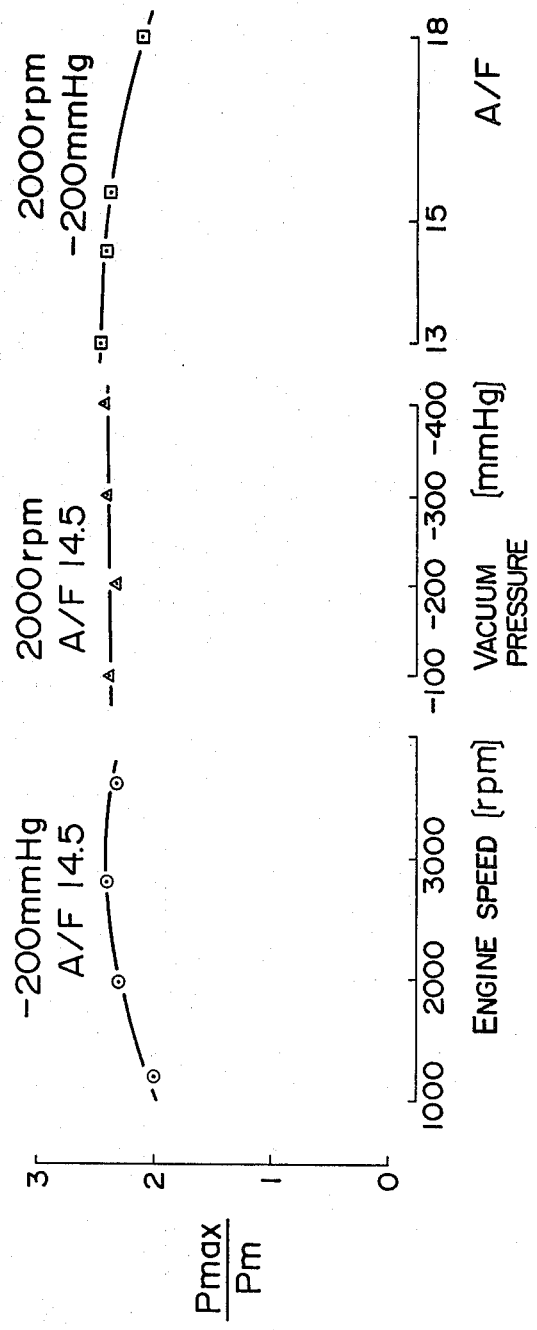
FIG. 1 is a characteristic diagram showing the relationship between various engine parameters and (the maximum pressure value Pmax)/(the motoring maximum pressure value Pm) at MBT.
Figure 2:
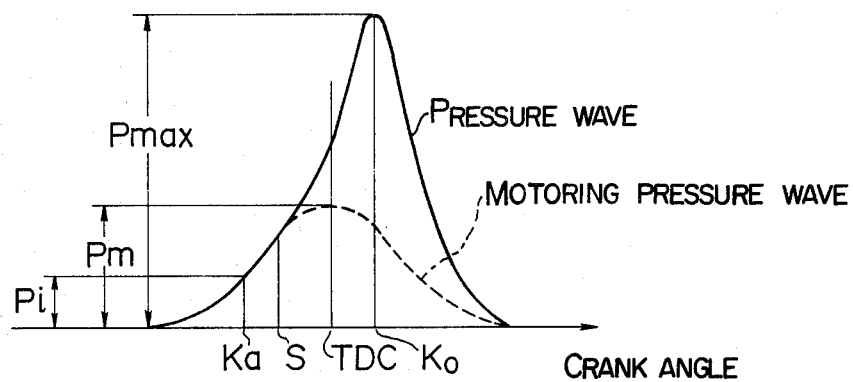
FIG. 2 is a cylinder pressure waveform diagram for an ordinary internal combustion engine.

It is well known in the art that there exists a close correlation between the ignition timing and the cylinder pressure. According to the results of experiments conducted under varying conditions on the ratio between the maximum value Pmax of the cylinder pressure attained when the mixture was exploded in the cylinders and the maximum value Pm of the cylinder pressure attained under motoring condition, namely, the maximum pressure value attained by operating the engine through an electric motor without production of ignition sparks or without explosion of mixture, it has been found that the value of Pmax/Pm tends to increase as the ignition timing is advanced. It has also been found that at the MBT (the minimum advance for best torque), the value of Pmax/Pm remains practically constant against variations in the engine parameters such as engine speed, intake manifold vacuum and A/F as shown in FIG. 1. It has also been found that though not shown, the value of Pmax/Pm remains practically constant against variations in the engine cooling water temperature and oil temperature. Thus, in a first embodiment of the invention, the ignition timing of an engine is controlled in a manner so that the value of Pmax/Pm is maintained constant. In this case, since it is impossible to detect the pressure Pm at the top dead center (TDC) of the crankshaft, as shown in FIG. 2, in the actual control the pressure Pm is represented by a pressure value Pi at a given fixed angle Ka before the maximum spark advance and the value of Pmax/Pi is detected to compensation control the ignition timing, namely, when the detected value of Pmax/Pi is smaller than a predetermined value the ignition timing is advanced, whereas when the value of Pmax/Pm is greater than the predetermined value the ignition timing is retarded, thus maintaining the ignition timing at around MBT irrespective of the operating conditions of the engine.

Figure 3:
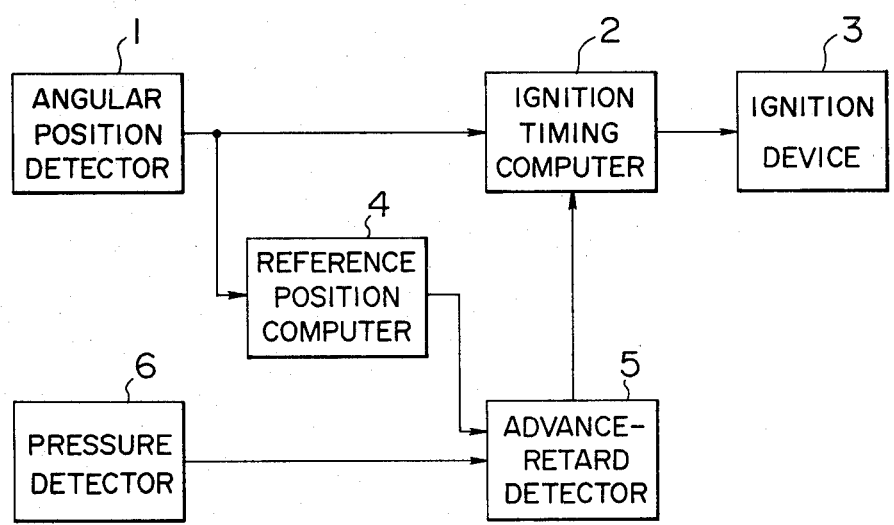
FIG. 3 is a block diagram showing a general construction of an ignition system according to the present invention.

Referring now to FIG. 3 showing a block diagram for an igntion system according to the present invention, numeral 1 designates an angular position detector for detecting two different angular positions of the crankshaft of a four-cylinder, four-cycle internal combustion engine, 2 an ignition timing computer circuit for computing the angle of spark advance by charging and discharging a capacitor in response to the signal from the angular position detector 1. Numeral 3 designates an ignition device of a known type for producing ignition sparks in response to the signal from the ignition timing computer circuit 2. Numeral 4 designates a reference position computer circuit for computing a reference position in accordance with the angular position detection signal from the angular position detector 1 in the like manner as the ignition timing computer circuit 2. Numeral 6 designates a pressure detector for detecting the pressure in the cylinders of the engine, 5 an advance-retard detector circuit for producing a signal in accordance with the detected cylinder pressure and the computed reference position to advance or retard the ignition timing.

Next, a detailed circuit construction of the first embodiment of the system of this invention will be described with reference to FIGS. 4 to 6. In the ignition timing computer circuit 2 shown in FIG. 4, a reference potential Vref is produced by resistors 220 and 221 and a capacitor 222 and applied through a bias resistors to an operational amplifiers which will be described later. The ignition timing computer circuit 2 further comprises a NOT circuit 21, a discharge control circuit 22, analog switches 23, 24 and 29 each being adapted to be turned on in response to a "1" level signal, a charge resistor 25, a discharge resistor 26, bias resistors 27 and 212 which are connected to the reference potential Vref, an input resistor 211, operational amplifiers 28 and 213, a capacitor 210 and an AND circuit 214. The resistors 25, 26 and 27, the capacitor 210 and the operational amplifier 28 constitute a Miller integrator circuit, whereby when the input voltage is lower than the reference potential Vref the capacitor 210 is charged, whereas when the input voltage is higher than the reference potential Vref the capacitor 210 is discharged. The resistors 211 and 212 and the operational amplifier 213 constitute a comparison circuit. The reference position detector circuit 4 shown in FIG. 4 comprises, similarly as the ignition timing computer circuit 2, a charge control circuit 41, a discharge control circuit 42, analog switches 43, 44 and 49 each being adapted to be turned on in response to a "1" level signal, a charge resistor 45, a discharge resistor 46, bias resistors 47 and 412 which are connected to the reference potential Vref, an input resistor 411, operational amplifiers 48 and 413, a capacitor 410 and an AND circuit 414. Each of the analog switches 23, 24, 29, 43, 44 and 49 may preferably comprise a field-effect transistor. Numeral 10 designates a key switch, 11 a battery constituting a power source, KS a supply terminal connected to the power source 11 through the key switch 10.

Figure 5:
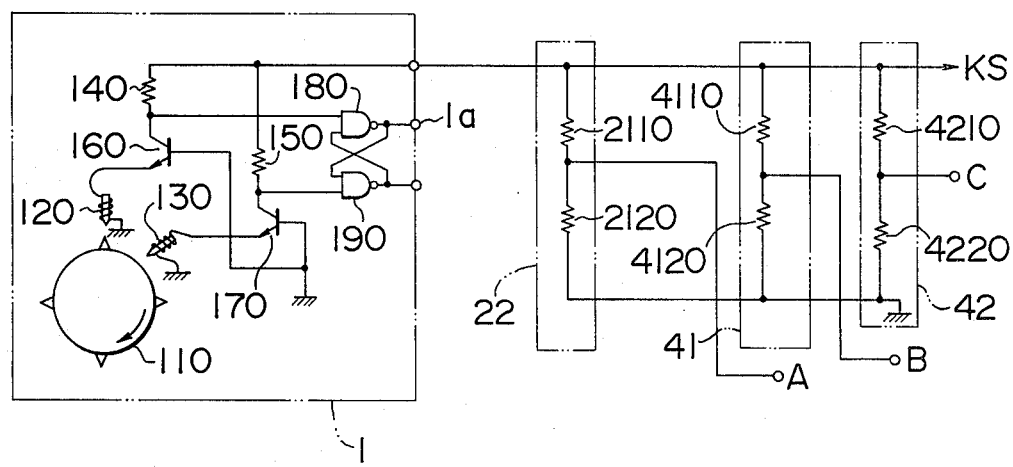
Figure 6:
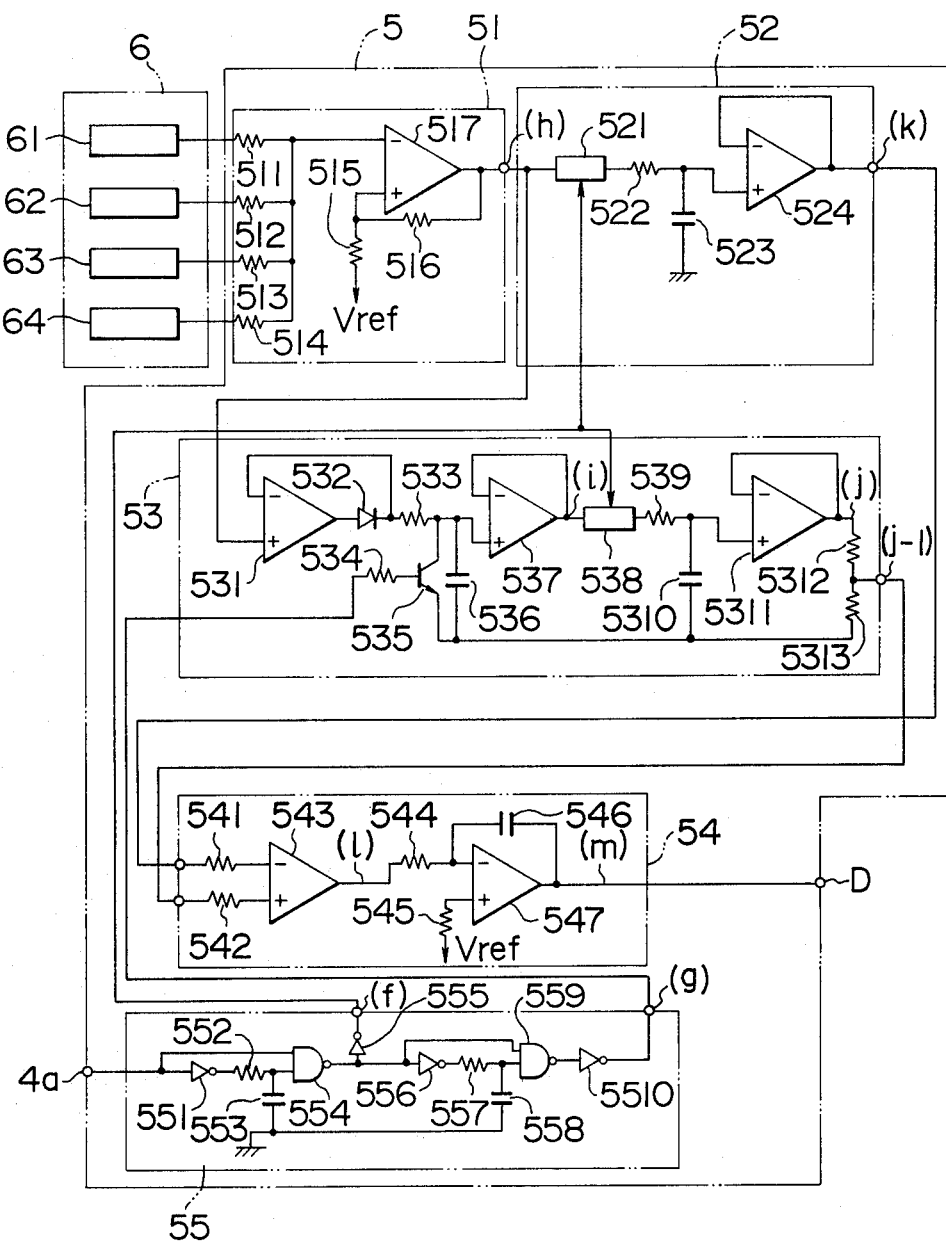

As shown in FIG. 5, the charge control circuit 41 of the reference position computer circuit 4 comprises resistors 4110 and 4120 and a predetermined potential which is lower than the reference potential Vref is delivered by resistance voltage division to its output terminal B.

Also, as shown in FIG. 5, the discharge control circuit 42 comprises resistors 4210 and 4220 and a predetermined potential which is always higher than the reference potential Vref is delivered by resistance voltage division to its output terminal C. The reference position computer circuit 4 determines the reference position Ka which represents a predetermined angular position in terms of crankshaft-angle degrees.

Figure 7:
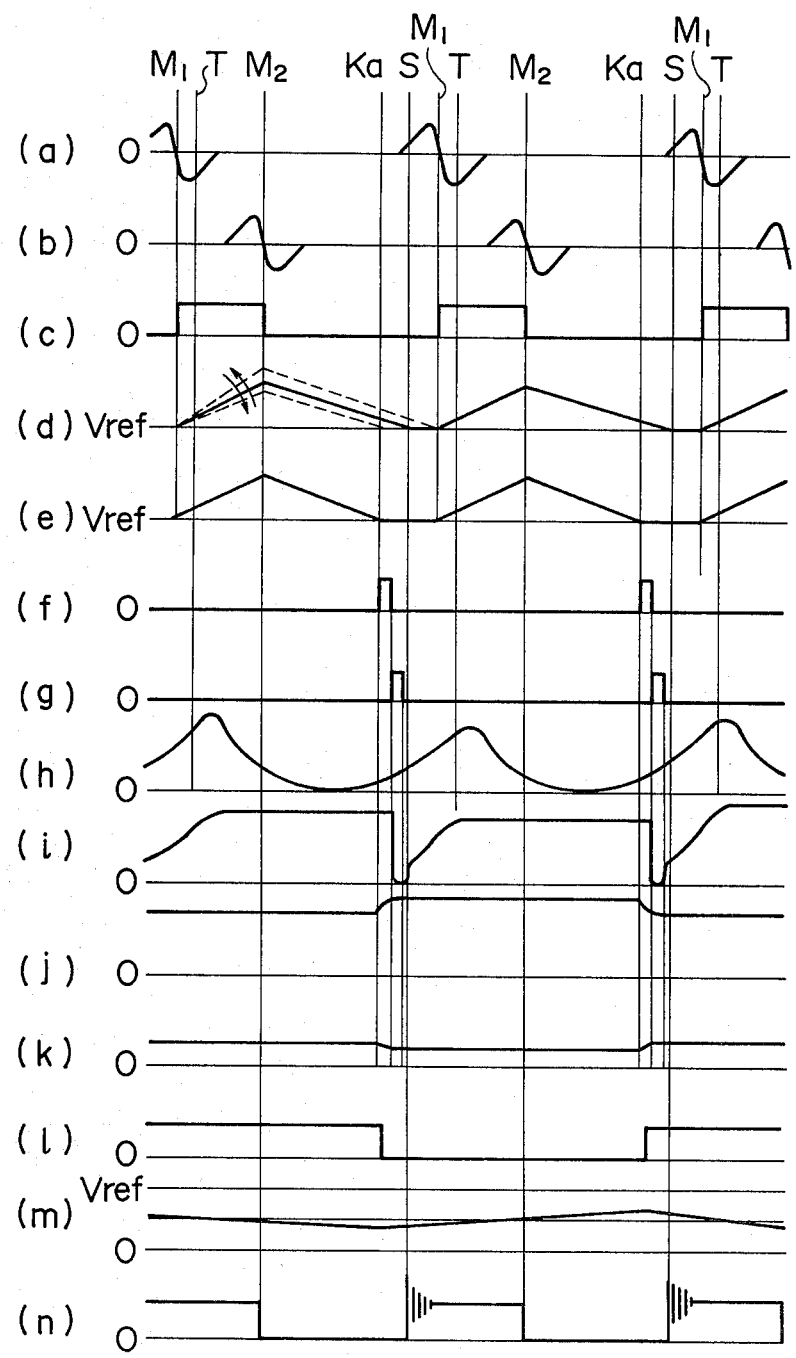
FIG. 7 is a time chart useful for explaining the operation of the first embodiment shown in FIGS. 4 through 6.

Next, an embodiment of a detailed circuit construction of the angular position detector 1 and the discharge control circuit 22 of the ignition timing computer circuit 2 will be described with reference to FIG. 5. In the angular position detector 1, numeral 110 designates a rotor having four projections which are arranged on its outer periphery at equal intervals and it is fixedly mounted on the distributor shaft of the four-cylinder engine which is not shown for rotation together with the distributor shaft. Numerals 120 and 130 designate first and second electromagnetic pickups which are arranged and displaced from each other by a predetermined angle in the circumferential direction of the rotor 110 to oppose the projections on the rotor 110. Numerals 160 and 170 designate transistors which are respectively connected to the electromagnetic pickups 120 and 130, and 140 and 150 are resistors. Numerals 180 and 190 designate NAND circuits constituting a flip-flop circuit having its one input connected to the collector of the transistor 160 and its other input connected to the collector of the transistor 170. The rotor 110 rotates once in the direction of the arrow for every two revolutions of the crankshaft so that when each of the projections on the rotor 110 passes the electromagnetic pickups 120 and 130, respectively, the electromagnetic pickups 120 and 130 produce negative-going signals as shown in (a) and (b) of FIG. 7. Consequently, the electromagnetic pickups 120 and 130 detect respectively angular positions $M_1$ and $M_2$ of the crankshaft for each engine cylinder. When the electromagnetic pickups 120 and 130 produce negative-going signals, the transistors 160 and 170 are turned on so that the flip-flop circuit comprising the NAND circuits 180 and 190 comes into operation in response to the turning on of the transistors 160 and 170 and an output as shown in (c) of FIG. 7 is produced at its one output terminal 1a. The discharge control circuit 22 comprises resistors 2110 and 2120 and it produces a predetermined potential which is higher than the reference potential Vref.

Next, the pressure detector 6 and the retard-advance detector circuit 5 will be described with reference to FIG. 6. In the pressure detector 6, numerals 61, 62, 63 and 64 designate pressure sensors mounted in the respective cylinders and the output potential of each pressure sensor increase with increase in the cylinder pressure. In the retard-advance detector circuit 5, numeral 51 designates an adder circuit for combining the four output signals of the pressure detector 6 and it comprises resistors 511, 512, 513, 514, 515 and 516 and an operational amplifier 517. The adder circuit 51 produces an output as shown in (h) of FIG. 7. Numeral 55 designates a monostable output generating circuit responsive to the output of the reference position computer circuit 4 to produce monostable outputs (f) and (g) from the time of the reference position Ka as shown in (f) and (g) of FIG. 7, namely, the monostable output (f) is produced by a monostable circuit comprising NOT circuits 551 and 555, a NAND circuit 554, a resistor 552 and a capacitor 553, and the monostable output (g) is produced in response to the negative-going transition of the monostable output (f) by another monostable circuit comprising NOT circuits 556 and 5510, a NAND circuit 559, a resistor 557 and a capacitor 558. Numeral 52 designates a hold circuit comprising an analog switch 521, a resistor 522, a capacitor 523 and an operational amplifier 524 for holding the value Pi of the pressure waveform at the reference position Ka as shown in (k) of FIG. 7, and it constitutes a reference position pressure value detecting circuit. Numeral 53 designates a maximum pressure value detecting circuit comprising a peack detector circuit including operational amplifiers 531 and 537, a diode 532, resistors 533 and 534, a transistor 535 and a capacitor 536, and a hold circuit including an analog switch 538, a resistor 539, a capacitor 5310 and an operational amplifier circuit 5311, whereby the output signal (h) of the adder circuit 51 is applied to the peak detector circuit so that the peak value of the input is detected by the opeational amplifier 531 and the diode 532 and it is then stored in the capacitor 536 through the resistor 533. On the other hand, the charge in the capacitor 536 is dissipated through the resistor 534 and the transistor 535 by the monostable output (g) each time it is produced, so that an output (i) as shown in (i) of FIG. 7 is produced by a voltage follower circuit comprising the operational amplifier 537 and the hold circuit derives from the output (i) the peak value Pmax of the pressure waveform as shown in (j) of FIG. 7 in response to the monostable output (f). The resulting output or the maximum value Pmax of the cylinder pressure is divided by resistors 5312 and 5313 and the output of the maximum pressure value detecting circuit 53 becomes as Pmax/m (m > 1). Numeral 54 designates an ignition timing compensation circuit or charging current control circuit comprising a comparison circuit including resistors 541 and 542 and an operational amplifier 543 and an integrator circuit including resistors 544 and 545, a capacitor 546 and an operational amplifier 547, and it receives as its inputs the output Pi of the hold circuit 52 and the output Pmax/m of the maximum pressure value detecting circuit 53 so that when the value of Pmax/m is higher than Pi, a "1" level signal is produced at an output (l) of the comparison circuit as shown in (l) of FIG. 7 and the potential at an output D of the charging current control circuit 54 is decreased with a negative-going slope through the integrator circuit as shown in (m) of FIG. 7. On the contrary, when the the value of Pmax/m is lower than Pi, a "0" level signal is produced at the output (l) of the comparison circuit and the potential at the output D of the charging current control circuit 54 increases with a positive-going slope as shown in (m) of FIG. 7. The output terminal of the charging current control circuit 54 is connected to an input terminal D of the analog switch 23 in the ignition timing computer circuit 2 shown in FIG. 4.

Next, the operation of the above-described first embodiment will be described with reference to the time chart of FIG. 7. The angular position detector 1 produces rectangular pulses in synchronism with the revolution of the engine crankshaft which is not shown, namely, it produces at its output terminal 1a an output which goes to the "1" level during the time interval between the angular positions $M_1$ and $M_2$ and which goes to the "0" level during the time interval between $M_2$ and $M_1$ as shown in (c) of FIG. 7 and the output consists of two pulses, two periods per revolution of the engine. When the output of the angular position detector 1 goes to the "1" level, the analog switch 23 of the ignition timing computer circuit 2 is turned on. At this time, the output of the NOT circuit 21 goes to the "0" level thus turning the analog switch 24 off, and the output signal of the AND circuit 214 goes to the "0" level thus turning off the capacitor resetting analog switch 29. Consequently, the capacitor 210 is charged starting at the point of $M_1$ from the reference potential Vref in accordance with the output of the retard-advance detector circuit 5 as shown in (d) of FIG. 7. The charging of the capacitor 210 eventually causes the output of the operational amplifier 28 to become higher than the reference potential Vref and the output of the comparison circuit goes to the "0" level.

Then, when the signal at the output terminal 1a of the angular position detector 1 goes to the "0" level at the point of $M_2$ so that the analog switch 23 is turned off and simultaneously the analog switch 24 is turned on, the capacitor 210 is caused to start discharging as shown in (d) of FIG. 7 at a predetermined discharge current determined by the constant potential of the discharge control circuit 22. When the discharge of the capacitor 210 is terminated so that the output of the operational amplifier 28 becomes lower than the reference potential Vref, the output of the comparison circuit is changed to the "1" level and the output of the AND circuit 214 goes to the "1" level, thus turning the analog switch 29 on and thereby maintaining the ouptut of the operational amplifier 28 constant at the reference potential Vref as shown in (d) of FIG. 7. The signal at an output terminal 2a of the ignition timing computer circuit 2 is applied to the ignition device 3 so that the ignition device 3 produces ignition sparks in response to the positive-going transition of this signal, namely, at a point S at which the discharge of the capacitor 210 is terminated.

Referring now to the reference position computer circuit 4, it is substantially identical in construction with the ignition timing computer circuit 2 and there is no difference in the method of computation between the two circuits. Namely, the reference position computer circuit 4 is the same as the ignition timing computer circuit 2 in that the capacitor 410 is charged during the time interval between the angular positions $M_1$ and $M_2$ and it is discharged during the time interval between $M_2$ and $M_1$ as shown in (e) of FIG. 7. However, since the output potentials B and C of the charge and discharge control circuits 41 and 42 are fixed and consequently both the charge and discharge currents are fixed, a reference position signal is always produced at its output terminal 4a at the predetermined reference position Ka before the top dead center T irrespective of the engine rotational speed.

In the retard-advance detector circuit 5, the monostable outputs (f) and (g) are produced so that at every reference position Ka of the crankshaft for each cylinder, the just preceding Pi and Pmax/m are respectively detected and held by the hold circuit 52 and the maximum pressure value detecting circuit 53 in response to the monostable output (f) and they are compared in the charging current control circuit 54 each time. Consequently, when the value of Pmax/m is greater than Pi, namely, when the value of Pmax/Pi is greater than the predetermined value m, the potential at the output terminal D is decreased, whereas when the value of Pmax/Pi is smaller than the predetermined value m, the potential at the output terminal D is increased. In this way, when the ignition timing has been retarded in relation to MBT, since the value of Pmax/Pi is smaller than the predetermined value m and consequently the output D of the charging current control circuit 54 increases with the resulting decrease in the charging current, the ignition timing is advanced by virtue of the discharge current being constant. On the contrary, when ignition timing has been advanced in relation to MBT, the ignition timing is retarded due to the fact that the value of Pmax/Pi becomes greater than the predetermined value m and consequently the output D of the charging current control circuit 54 decreases with the resulting increase in the charging current. In this way, depending on whether the preceding Pmax/Pi is greater or smaller than the predetermined value m, the ignition timing is retarded or advanced, namely, the ignition timing is controlled to cause the value of Pmax/Pi to approach the predetermined value m and thereby ensure that the ignition always occurs at MBT.

Figure 8:
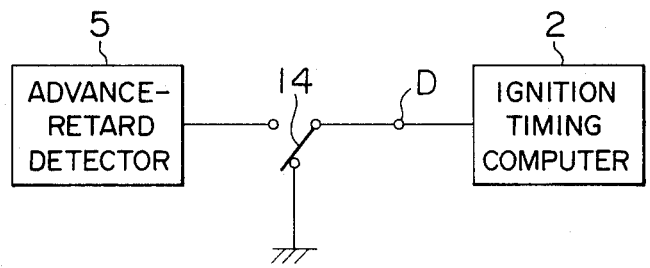
FIG. 8 is a block diagram showing the principal parts of a modification of the first embodiment.

While, in the above description of the first embodiment, the operation of the system under the starting and idling conditions has not been described, in consideration of the actual operating conditions of the engine, as shown in FIG. 8, during the periods of starting and idling the input D to the ignition timing computer circuit 2 may be forcibly reduced to zero by means of a switch 14 so that the charging current is increased to the maximum and the ignition timing is retarded to the full retarded position to effect the ignition, while under other operating conditions the output of the retard-advance detector circuit 5 may be applied to the ignition timing computer circuit 2.

Referring now to FIGS. 9 through 13, a second embodiment of the invention will be described with particular emphasis on the differences between the first and second embodiments.

Figure 4:
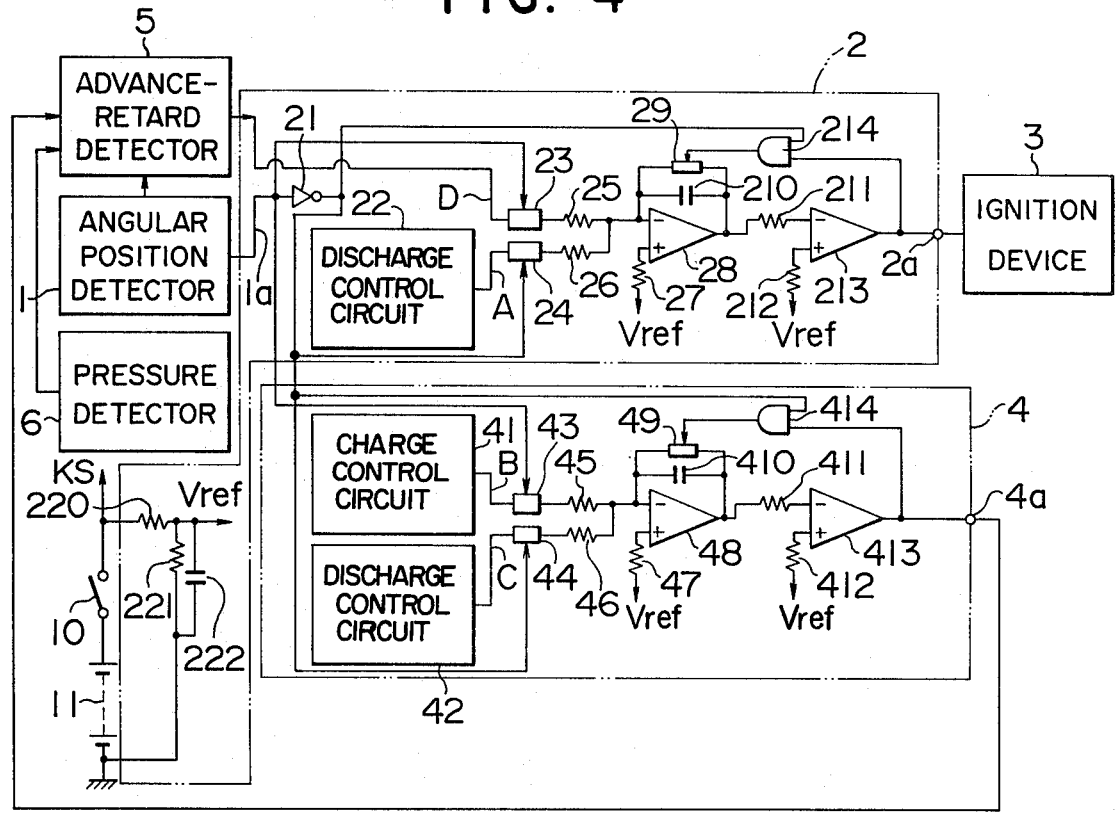
FIGS. 4 through 6 are wiring diagrams showing a detailed circuit construction of a first embodiment of the invention.

The angular position detector 1, the ignition timing computer circuit 2, the ignition device 3 and the reference position computer circuit 4 are the same or similar in construction with their counterparts in the first embodiment shown in FIG. 4. With the second embodiment, it should be noted that the reference position computer circuit 4 computes a reference position Ko shown in FIG. 2 and this reference position Ko is set to the crankshaft angular position at which the cylinder pressure attains its maximum value. And this reference position Ko is after the top dead center (TDC) of the crankshaft.

Figure 9:
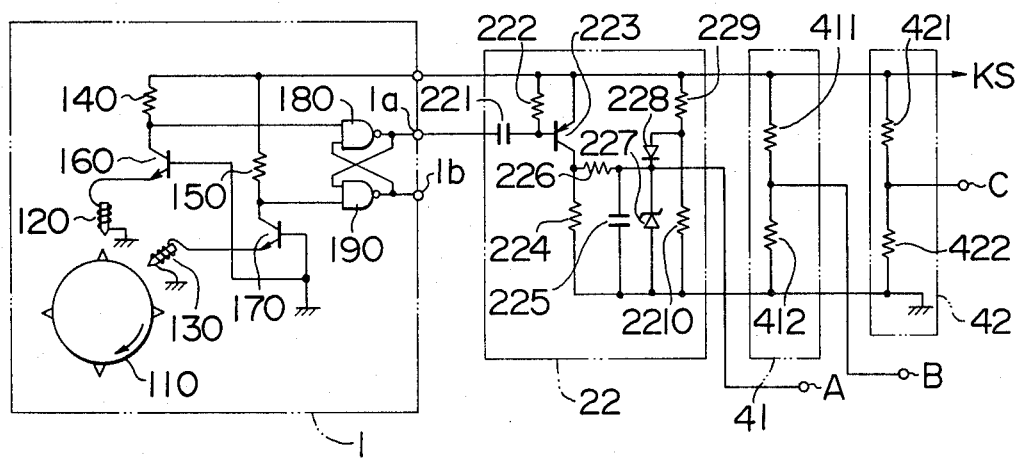

As shown in FIG. 9, the discharge control circuit 22 of the ignition timing computer circuit 2 comprises capacitors 221 and 225, resistors 222, 224, 226, 229 and 2210, a transistor 223, a Zener diode 227 and a diode 228, and the differentiated pulse output produced by the capacitor 221 and the resistor 222 is integrated by the capacitor 225. In this case, since the transistor 223 is turned on only during the time that the output pulse at the output terminal 1a of the angular position detector 1 goes from the "1" to "0" level or the predetermined time width of the differentiated pulse from the angular position $M_2$, the potential across the capacitor 225 substantially linearly increases with increase in the engine speed. However, since the capacitor potential at higher engine speeds is limited to a predetermined value by the Zener diode 227 and the capacitor potential at lower engine speeds is also limited to a predetermined value by the divided potential of the dividing resistors 229 and 2210, the resulting output potential A of the discharge control circuit 22 which is corresponding to the engine speed n becomes as shown in (A) of FIG. 12. In this case, the output potential A of the discharge control circuit 22 is always higher than the reference potential Vref.

Next, a detailed circuit construction of the pressure detector circuit 6 will be described with reference to FIG. 10. Numerals 61, 62, 63 and 64 designate pressure sensor circuits associated with the respective cylinders of the engine, and the circuit construction of the pressure sensor circuits 62 to 64 shown in block diagram form is identical with that of the pressure sensor circuit 61. The outputs of these pressure sensor circuits are all connected to a maximum pressure detecting circuit 65. Thus, only the pressure sensor circuit 61 will be described by way of example. Numeral 611 designates a piezoelectric transducer which may for example be mounted in the associated cylinder by inserting in the plug mounting hole of the cylinder along with the spark plug. The piezoelectric transducer 611 is mounted in a manner so that its output potential tends to increase with increase in the cylinder pressure. Numerals 612 and 613 designate distributed capacitances of the piezoelectric transducer 611 and the lead line, 614 a distributed resistance of the lead line. A charge amplifier is constituted by a capacitor 618, a resistor 615 connected to the reference potential Vref, resistors 617 and 619 and an operational amplifier 616, and an output signal 61a of the pressure sensor circuit 61 tends to decrease its output potential with increase in the cylinder pressure. The maximum pressure point detecting circuit 65 comprises an adder including resistors 651, 652, 653 and 654 which are respectively connected to the pressure sensor circuits 61 through 64, resistors 656 and 658 and an operational amplifier 657, a differentiation circuit including a capacitor 659, resistors 6510 and 6512, a resistor 6511 connected to the reference potential Vref and an operational amplifier 6513, and a comparator including resistors 6514 and 6518, a resistor 6517 connected to the reference potential Vref and an operational amplifier 6516. Outputs 61a through 64a of the pressure sensor circuits 61 through 64 are combined in the adder. The adder output signal is differentiated by the differentiation circuit and the resulting differentiated output is compared with the reference potential Vref in the comparator. Thus, the output of the comparator goes to the "1" level only when the differentiated output is lower than the reference potential Vref. In other words, when the pressure in each cylinder attains its maximum at a point Km, the output of the maximum pressure point detecting circuit 65 goes to the "1" level.

Next, a detailed circuit construction of the retard-advance detector circuit 5 will be described with reference to FIG. 11. A terminal 5a is connected to the output terminal 4a of the reference position computer circuit 4, a terminal 5b is connected to an output terminal 65a of the pressure detecting circuit 6, and a terminal 5c is connected to an output terminal 1b of the angular position detector 1. The terminal 5a is also connected to the input terminal of a NOT circuit 71 whose output terminal is connected to one input terminal of a NAND circuit 75 through a differentiation circuit comprising a resistor 72 and a capacitor 73. The other input terminal of the NAND circuit 75 is directly connected to the terminal 5a. The NOT circuit 71, the resistor 72, the capacitor 73 and the NAND circuit 75 constitute a monostable circuit which produces a "0" level output when the input signal to the input terminal 5a changes to the "1" level. Similarly, a NOT circuit 76 connected to the input terminal 5b, a resistor 77, a capacitor 78 and a NAND circuit 79 constitute a monostable circuit which produces a "0" level output when the input signal to the terminal 5b changes to the "1" level. Also, NAND circuits 710 and 711 and NAND circuits 712 and 713 respectively constitute a flip-flop circuit whose one input is connected to the output terminal of the associated monostable circuit and other input is connected to the terminal 5c. The output terminal of the NAND circuit 710 is also connected to one input of a NAND circuit 716 and an EXCLUSIVE OR circuit 714, respectively, and the output terminal of the NAND circuit 713 is also connected to one input terminal of an AND circuit 715 and to the other input terminal of the EXCLUSIVE OR circuit 714. The output terminal of the EXCLUSIVE OR circuit 714 is connected to the other input terminal of the NAND circuit 716 and the AND circuit 715, respectively, and the output terminals of the NAND circuit 716 and the AND circuit 715 are respectively connected to the base of transistors 717 and 720 through resistors 726 and 727. Thus, the time difference between the reference position signal and the maximum pressure signal is detected in the circuit section extending from the input terminals 5a, 5b and 5c to the NAND circuit 716 and the AND circuit 715, whereby when the maximum pressure signal is produced later than the reference position signal, a "0" level signal is produced at the output terminal of the NAND circuit 76 in accordance with the time difference. On the contrary, when the maximum pressure signal is produced earlier than the reference position signal, a "1" level signal is produced at the output terminal of the AND 515 is accordance with the time difference. The following circuit section including the transistors 717 and 720, resistors 718, 719, 725 and 723, a capacitor 721, a diode 724 and a Zener diode 722 is designed so that when the transistor 717 is turned on the capacitor 721 is charged, whereas when the other transistor 720 is turned on the capacitor 721 is discharged. Consequently, the voltage across the capacitor 721 is changed only when a "0" level signal is produced from the NAND circuit 716 as well as when a "1" level signal is produced from the AND circuit 715, and the capacitor voltage substantially linearly increases during the time that a "0" level signal is produced from the NAND circuit 716. In this case, however, the upper limit of the capacitor voltage has been set by the Zener diode 722 so that after the capacitor voltage has attained the upper limit, the capacitor voltage is maintained constant at this level. On the other hand, the voltage across the capacitor 721 substantially linearly decreases during the time that a "1" level signal is produced from the AND circuit 715 and the lower limit of the capacitor voltage has been set by the diode 724. Consequently, after the capacitor voltage has reached the lower limit, it is maintained constant at this level. Thus, the voltage across the capacitor 721 linearly varies within the predetermined limits. The output voltage of the capacitor 721 is coupled through an output terminal 5d to the input terminal D of the analog switch 23 of the ignition timing computer circuit 2 to determine the charging current of the ignition timing computer circuit 2. The output potential D of the retard-advance detector circuit 5 is always kept lower than the reference potential Vref.

Next, the operation of the above-described second embodiment will be described. The angular position detector 1 is designed so that when the pulses shown in ($a_1$) and ($a_2$) of FIG. 13 are applied to the angular position detector 1 in synchronism with the revolution of the engine crankshaft, it produces at its output terminal 1a and output which goes to the "1" level during the time interval between the crankshaft angular positions $M_1$ and $M_2$ and which goes to the "0" level during the time interval between $M_2$ and $M_1$ as shown in (b) of FIG. 13, and this output consists of two pulses, two periods per revolution of the engine. The crankshaft angular positions $M_1$ and $M_2$ are shown at positions which are different from those of the first embodiment. When the output of the angular position detector 1 goes to the "1" level, the analog switch 23 of the ignition timing computer circuit 2 is turned on. At this time, the output of the NOT circuit 21 goes to the "0" level thus turning off the analog switch 24, and the output signal of the AND circuit 214 goes to the "0" level thus turning off the capacitor resetting analog switch 29. Consequently, the capacitor 210 is charged starting at the point of $M_1$ from the reference potential Vref in accordance with the output of the retard-advance detector circuit 5 as shown in (c) of FIG. 13. As the capacitor 210 is charged in this way, the output of the operational amplifier 28 eventually becomes higher than the reference potential Vref and the output of the comparison circuit goes to the "0" level.

Then, when the signal at the output terminal 1a of the angular position detector 1 goes to the "0" level at the point of $M_2$, the analog switch 23 is turned off and simultaneously the analog switch 24 is turned on. Consequently, as shown in (c) of FIG. 13, the capacitor 210 is caused to start discharging at a discharge current determined by the discharge control circuit 22 in accordance with the engine rotational speed as shown in (B) of FIG. 12. Then, when the discharging of the capacitor 210 is completed so that the output of the operational amplifier 28 becomes lower than the reference potential Vref, the output of the comparison circuit is changed to the "1" level and the output of the AND circuit 214 goes to the "1" level. Consequently, the analog switch 29 is turned on and the output of the operational amplifier 28 is maintained constant at the reference potential Vref as shown in (c) of FIG. 13. The resulting signal at the output terminal 2a of the ignition timing computer circuit 2 is applied to the ignition device 3 and the ignition device 3 produces ignition sparks in response to the positive-going transition of the input signal.

Referring now to the reference position computer circuit 4, its construction is substantially the same as the ignition timing computer circuit 2 and there is no difference in the method of computation between the two circuits. The reference position computer circuit 4 is also the same in that the capacitor 410 is charged during the time interval between the angular positions $M_1$ and $M_2$ and the capacitor 410 is discharged during the time interval between $M_2$ and $M_1$. However, the charge and discharge control circuits 41 and 42 are connected in a different manner, and when the output at the output terminal 4a goes to the "1" level this point only serves as a reference position detecting point thus producing no ignition sparks. In other words, in the reference position computer circuit 4, the output currents of the charge control circuit 41 and the discharge control circuit 42 are constant and consequently a reference position signal is always produced at the output terminal 4a at the predetermined reference position Ko irrespective of the engine rotational speed.

On the other hand, the cylinder pressure signal detected by each of the pressure sensor circuits 61, 62, 63 and 64 is detected by the maximum pressure point detecting circuit 65 in such a manner that its output goes to the "1" level at the maximum pressure point and the resulting output at the output terminal 65a of the maximum pressure point detecting circuit 65 is applied to the input terminal 5b of the retard-advance detector circuit 5. The output of the reference position computer circuit 4 which is computed to go to the "1" level at the reference position Ko, is also applied to the input terminal 5a of the retard-advance detector circuit 5. In addition, the inverted signal produced at the output terminal 1b of the angular position detector 1 is applied to the input terminal 5c of the retard-advance detector circuit 5. Consequently, the NAND circuit 75 produces at its output a signal which goes to the "0" level at the reference position Ko as shown in (e) of FIG. 13, while the NAND circuit 79 produces at its output a signal which goes to the "0" level at the maximum pressure position Km as shown in (h) of FIG. 13. At this time, the input signal at the input terminal 5c is at the "1" level so that the NAND circuit 710 produces a "1" level signal as shown in (f) of FIG. 13 and the NAND circuit 713 produces a "1" level signal as shown in (i) of FIG. 13. Consequently, the EXCLUSIVE OR circuit 714 produces a signal which goes to the "1" level only during the time that the output signals of the NAND circuits 710 and 713 are out of phase. The NAND circuit 716 performs the NAND operation on the output of the EXCLUSIVE OR circuit 714 and the output of the NAND circuit 710 and the output of the NAND circuit 716 becomes as shown in (j) of FIG. 13. As a result, when the maximum pressure position Km is retarded in relation to the reference position Ko, the transistor 717 is turned on by the output of the NAND circuit 716 for a period of time corresponding to the delay time so that the potential at the output terminal 5d is increased and the ignition timing is advanced. On the other hand, the AND circuit 715 performs the AND operation on the output of the EXCLUSIVE OR circuit 714 and the output of the NAND circuit 713 and the output of the AND circuit becomes as shown in (k) of FIG. 13. Conseqently, when the maximum pressure position Km is advanced in relation to the reference position Ko, the transistor 720 is turned on by the output of the AND circuit 715 for a period of time corresponding to the delay time, so that the potential at the output terminal 5d is decreased and the ignition timing is retarded. In other words, the retard-advance detector circuit 5 detects whether the maximum pressure position Km which varies in accordance with the engine operating conditions is advanced or retarded in relation to the reference position Ko and at the same time the charging current of the ignition timing computer circuit 2 is controlled in accordance with the time difference between the two positions as shown in (c) of FIG. 13, namely, the ignition timing is retarded when the maximum pressure position is advanced in relation to the reference position Ko, whereas the ignition timing is advanced when the reverse is the case. In other words, the ignition timing is controlled in a manner so that when the deviation is great the angular difference between the positions Km and Ko is increased with the resulting increase in the amount of compensation, whereas when the difference between the positions Km and Ko is small the amount of compensation is decreased, thereby reducing the hunting phenomenon caused by the compensation and ensuring an improved response characteristic. In this case, since the control range is limited by the Zener diode 722 and the diode 724, even if the detection of the maximum pressure position Km is indefinite, there is no danger of the ignition timing from being deviated considerably from the predetermined program and smooth ignition timing control is ensured.

Since, in the above-described embodiment, the amount of discharge current is varied in accordance with the engine rotational speed n to vary the ignition timing in accordance with the engine speed, the resulting spark advance characteristic corresponds to the MBT characteristic which is generally known as the best fuel consumption point. Since the MBT characteristic brings about an increase in the engine speed at its start or at the idling operation thus requiring no spark advance, as shown in (c) of FIG. 12, the minimum discharge current is set by the diode 228 of the discharge control circuit 22 so that the spark advance is started upon the termination of the idling period. In this way, smooth ignition timing control with improved fuel consumption is ensured throughout the engine operations extending from the low speed (idling) operation to the high speed operation.

Figure 14:
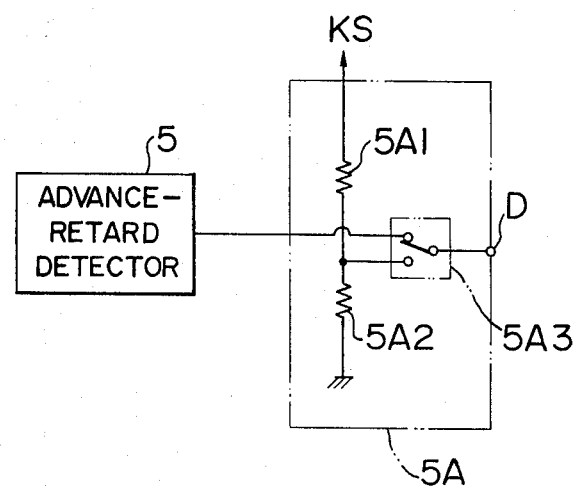
FIGS. 14 through 17 are wiring diagrams showing, part in block form, the principal parts of modifications of the second embodiment.

While, in the above-described embodiment, the provision of compensation by pressure detection is effected in the charging section, the invention is not limited to this compensating method and therefore it is possible to provide compensation either in the charging section or the discharge section. Further, while, in the above described embodiment, the spark advance is accomplished with the MBT characteristic in accordance with the engine operating conditions, another embodiment of the invention which is designed to control the ignition timing in accordance with a spark advance characteristic other than the MBT characteristic, namely, a control method in which during deceleration periods of an engine the MBT characteristic is inhibited and the ignition timing is retarded, will now be described. In other words, as shown in FIG. 14, an auxiliary charge control circuit 5A is added to the retard-advance detector circuit 5 which constitutes a charge control circuit for the ignition timing computer circuit 2 in the previously described second embodiment. The auxiliary charge control circuit 5A comprises resistors 5A1 and 5A2, and a switch 5A3 which normally connects the output terminal D to the retard-advance detector circuit 5 and which changes the connections during the idling or deceleration period to connect the output terminal D to a voltage determined by the dividing resistance values of the resistors 5A1 and 5A2. Consequently, at the idling or deceleration operation, the ignition timing is not subjected to any feedback compensation and the ignition timing is controlled according to a basic spark advance characteristic which is determined by the auxiliary charge control circuit 5A and the discharge control circuit 22 and which is a reciprocal characteristic in relation to the engine speed without compensation, thus restricting the engine torque and thereby facilitating the deceleration of the engine.

Figure 15:
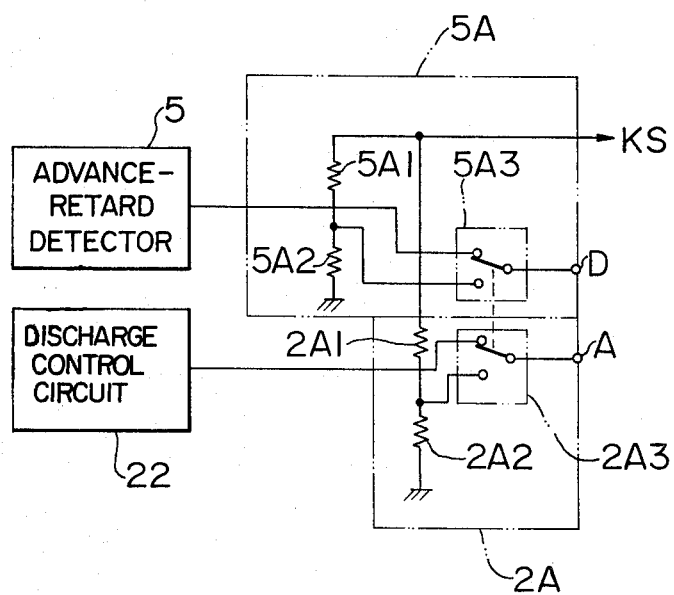

FIG. 15 illustrates still another embodiment of the invention which is different from the above-mentioned another embodiment in that an auxiliary discharge control circuit 2A is also provided in the discharge control circuit section to fix the ignition timing during the deceleration or idling operation. The auxiliary discharge control circuit 2A comprises resistors 2A1 and 2A2, and a switch 2A3 which normally connects an output terminal A to the discharge control circuit 22 and which changes the connections during the idling or deceleration period to connect the output terminal A to a voltage determined by the dividing resistance values of the resistors 2A1 and 2A2, whereby during the idling or deceleration operation the charge and discharge contril circuits of the ignition timing computer circuit 2 are respectively operated at the fixed voltage and the ignition of the engine is effected at a preset angular position. Each of the switches 5A3 and 2A3 may for example be a limit switch responsive to the position of the accelerator pedal to change the connections.

Figure 16:
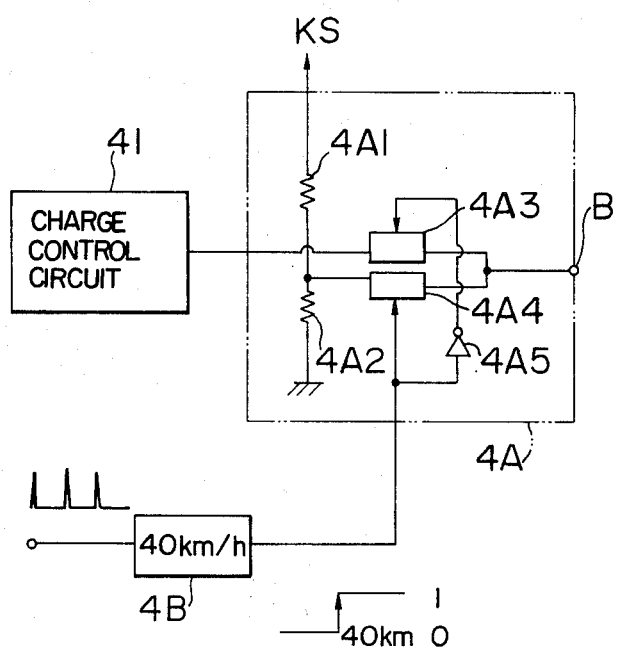

FIG. 16 illustrates still another embodiment of the invention wherein the reference position Ko is varied in accordance with an engine parameter. In the Figure, numeral 4A designates an auxiliary charge control circuit comprising resistors 4A1, and 4A2, analog switches 4A3 and 4A4 and a NOT circuit 4A5, 4B a vehicle speed detecting circuit of a known type for detecting the number of pulses produced by for example the teeth of the ring gear of the engine and producing a "1" level signal when the vehicle speed exceeds 40 km/hr and having its output connected to the analog switch 4A3 through the analog switch 4A4 which is turned on in response to the application of a positive voltage and the NOT circuit 4A5. In operation, at vehicle speeds below 400 km/hr the potential of the charge control circuit 41 appears at the output terminal B, whereas at vehicle speeds over 40 km/hr a DC voltage which is determined by the resistors 4A1 and 4A2 appears at the output terminal B. Consequently, the reference position Ko is switched in a step fashion with the vehicle speed of 40 km/hr as a threshold value.

Figure 17:
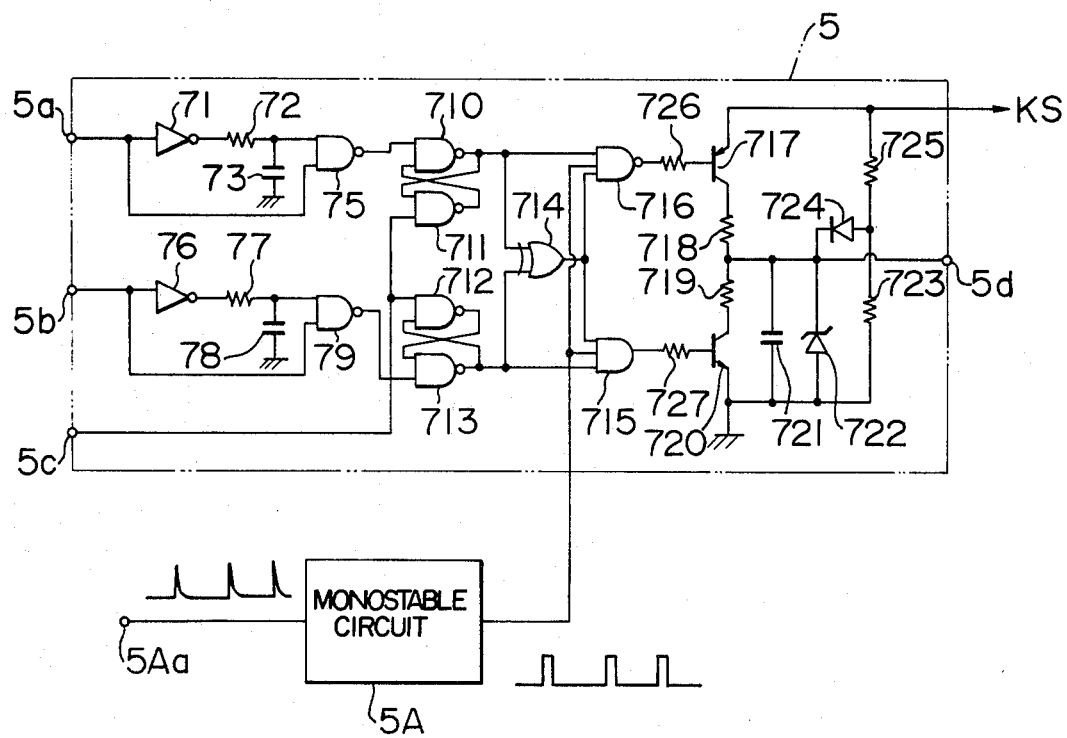

FIG. 17 illustrates still another embodiment wherein the pulses produced for example by the teeth of the ring gear of an engine or the pulses proportional to the engine speed and greater in number than the number of ignitions are detected by an electromagnetic pickup or the like and applied to an input terminal 5Aa. The applied speed pulses are reshaped by a monostable circuit 5A, so that signals which correspond to the speed pulses and go to the "1" level for a determined time are produced and applied to one inputs of the AND circuit 715 and NAND circuit 716. Consequently, only when the reshaped speed pulses proportional to the engine speed go to the "1" level, the AND circuit 715 and the NAND circuit 716 are opened to compensate the ignition timing and in this way the amount of compensation for the ignition timing is increased with increase in the engine speed, thus similarly attaining the previously mentioned objects in accordance with the engine speed.

While, the above-mentioned embodiments of the invention, the analog type ignition timing computer circuit is used in which the capacitor 210 is charged and discharged to compute the ignition timing, any other ignition timing computer circuit of the digital type, for example, may also be used.

Further, while, in the above-described embodiments, the reference position Ko is detected by charging and discharging the capacitor 410, a third angular position sensor may be mounted for the purpose of detecting the reference position Ko.

Still further, while, in the above-described embodiments, the angular position detector 1 employs electromagnetic pickups to detect the crankshaft angular positions, it is possible to detect similarly the angular positions by means of a photoelectric type or contact point type detector.

Still further, while, in the above-described embodiments, only the engine speed is utilized as an engine parameter, a plurality of such engine parameters as the intake negative pressure, engine cooling water temperature, etc., may be utilized simultaneously.

It will thus be seen from the foregoing that an ignition system provided according to the present invention has the following advantages by virtue of the fact that the ignition timing is controlled by feedback compensating an electronic engine speed spark advance characteristic in accordance with the engine cylinder pressure:

(1) The optimum operation which has heretofore been considered difficult to ensure with the conventional programmed ignition systems due to differences in the operating conditions and characteristics of individual engines can be ensured for the individual ignition systems, and moreover during starting periods, etc., of an engine where a fine spark advance characteristic is required the proper ignition position can be suitably determined in accordance with the engine operating conditions and the optimum spark advance characteristic that suits the individual engines can be easily ensured.

(2) Conventionally, where it is desired to compensate the ignition system in accordance with other parameters such as the atmospheric pressure, temperature and humidity, i.e., the compensation which is generally considered necessary for the operation of an engine, it is necessary to provide a compensation circuit for each of these parameters and moreover a high degree of accuracy is required for these circuits, thus necessitating an expensive and complicate system. With the system of this invention, however, the internal condition of an engine is detected to automatically time the ignition to occur at the optimum point, thus requiring no great accuracy for its circuits and thereby making the system simple and inexpensive.

(3) Further, where the amount of feedback compensation is limited, if the engine is not stable, as for example, during the staring period or during the period when the detection of cylinder pressure is not certain, the ignition timing can still be prevented from deviating from a predetermined ignition timing thus ensuring smooth operation of the engine, and moreover the necessary transient follow up can be ensured during engine operations such as during acceleration and deceleration operations where the engine operating conditions change radidly.

We claim:

1. An ignition system for controlling the timing of ignition of an internal combustion engine comprising:
position detecting means for detecting a predetermined rotational angular position of said engine to produce an angular position signal;
pressure detecting means for detecting the pressure present within the cylinder of said engine to produce a pressure signal;
maximum pressure detecting means for detecting the maximum value of the pressure represented by said pressure signal;
reference pressure detecting means for detecting the reference value of the pressure represented by said pressure signal at a timing represented by said angular position signal;
discriminating means for discriminating means for discriminating whether the ratio of said maximum value relative to said reference value is larger than a predetermined value; and timing control means for controlling the timing of ignition in response to the discrimination result of said discriminating means.

2. An ignition system according to claim 1, wherein said discriminating means includes:
   driving means for driving said maximum value by said predetermined value to produce a divided value proportional to said maximum value; and
   comprising means for comparing said divided value with said reference value to produce a comparison output signal indicative of the discrimination result.

3. An ignition system according to claim 2, wherein said timing control means includes:
   a first and second position detecting means for detecting a first and second rotational angular position of said engine to produce first and second angular position signals, said first and second angular positions being predetermined to be detected prior to said predeterminted rotational angular position;
   condition detecting means for detecting operating conditions of said engine to produce condition signals;
   a capacitor adapted to be charged from an initial value after the timing represented by said first angular position signal and discharged after the timing represented by said second angular position signal; and
   capacitor control means for controlling at least one of charging and discharging of said capacitor in response to said condition signals and said comparison output signal.

4. An ignition system for controlling the timing of ignition of an internal combustion engine having a cylinder, said ignition system comprising:
   position detecting means for generating an angular position signal indicative of the rotational angular position of said engine;
   pressure detecting means for generating a pressure signal indicative of the pressure present within the cylinder of said engine;
   maximum pressure detecting means, responsive to said pressure signal, for generating a Pmax signal indicative of the maximum value of the pressure within the cylinder during a cycle of operation;
   reference pressure detecting means, responsive to said angular position signal and said pressure signal, for generating a P1 reference signal indicative of the pressure within the cylinder with said engine in a predetermined reference angular position;
   discriminating means, responsive to said Pmax signal and said P1 signal, for generating a control signal indicative of the ratio of said maximum value of pressure relative to said pressure with the engine in said reference angular position; and
   timing control means for controlling the timing of ignition in said engine in response to said control signal discriminating means.

5. An ignition system according to claim 1, wherein said discriminating means includes:
   dividing means, responsive to said Pmax and P1 signals, for generating a ratio signal indicative of said maximum value of pressure with said engine in said reference angular position; and
   comparing means for generating a comparison signal indicative of the magnitude of said ratio with a predetermined threshold.

6. An ignition system according to claim 2, wherein said timing control means includes:
   means for generating a first and second rotational angular position signals indicative of first and second predetermined angular position signals, said first and second angular position signals being prior to said predetermined reference rotational angular position in the operational cycle of said cylinder;
   condition detecting means for detecting the operating condition of said engine to produce condition signals;
   a capacitor adapted to be charged from an initial value after the timing represented by said first angular position signal and discharged after the timing represented by said second angular position signal; and
   capacitor control means for controlling at least one of charging and discharging of said capacitor in response to said condition signals and said comparison signal.

* * * * *